US006204866B1

(12) United States Patent
Yonenaga

(10) Patent No.: US 6,204,866 B1
(45) Date of Patent: Mar. 20, 2001

(54) IMAGE FORMING APPARATUS WITH INTERMEDIATE BELT MARK DETECTION FOR IMAGE REGISTRATION

(75) Inventor: Kohtaroh Yonenaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/526,553

(22) Filed: Mar. 16, 2000

(30) Foreign Application Priority Data

Mar. 23, 1999 (JP) ..................................................... 11-077193

(51) Int. Cl.$^{7}$ .............................. G03G 15/01; H04N 1/04

(52) U.S. Cl. ............................ 347/116; 347/235; 358/501

(58) Field of Search ..................................... 347/116, 115, 347/119, 234, 235; 399/301, 302; 358/501

(56) References Cited

U.S. PATENT DOCUMENTS 5,631,691 * 5/1997 Furuta et al. ......................... 347/235
5,646,749 * 7/1997 Omi et al. ............................ 358/501

FOREIGN PATENT DOCUMENTS 4-175774 6/1992 (JP) .
5-227386 9/1993 (JP) .

* cited by examiner

*Primary Examiner*—Joan Pendegrass
(74) *Attorney, Agent, or Firm*—Oblon, Spivak, McClelland, Maier & Neustadt, P.C.

(57) ABSTRACT

Depending on an arbitrarily set magnification of an image forming apparatus, either pulses of a line synchronization signal or pulses of a motor driving signal are selected. Each of the pulses of the line synchronization signal being generated when the laser beam scans the photosensitive drum in a main scan direction and the pulses of the motor driving signal are used for driving a scanner motor provided in an original reading unit at different speeds so as to enable the original to be read at different speeds so as to enable the magnification to be set to different values. The pulses of the signal thus selected are counted and a thus-obtained count value is output. Based on the count value, a time period between a time a reference mark provided on an intermediate transfer belt is detected and a time an electrostatic latent image is written on a photosensitive drum, when the electrostatic latent image is formed using image data output by the original reading unit directly and the electrostatic latent image is formed using image data stored and read out from a memory.

11 Claims, 11 Drawing Sheets

| MAGNIFICATION (%) | DISTANCE MOVED BY FIRST CARRIAGE(mm) | |
|---|---|---|
| | PER PULSE OF Lsync | PER PULSE OF MOTOR DRIVING SIGNAL |
| 25 | 0.169 | 0.10 |
| 100 | 0.040 | 0.05 |
| 400 | 0.010 | 0.05 |

IMAGE FORMING APPARATUS WITH INTERMEDIATE BELT MARK DETECTION FOR IMAGE REGISTRATION

BACKGROUND OF THE INVENTION

1. Field of the Invention

The present invention generally relates to an image forming apparatus such as a digital color copier, printer or the like, and, in particular, to a color-image forming apparatus in which color displacement does not occur, and, thereby, it is possible to form high-quality color images.

2. Description of the Related Art

Recently, in order to improve the image-formation efficiency, as disclosed in Japanese Laid-Open Patent Application No. 4-175774, in an image forming apparatus for forming multi-color images from image information obtained through an image reading device or sent from a host apparatus, two color images, each having a standard size, such as A-4 size, are formed on a photosensitive belt having a length more than twice that of the standard size, and two toner images formed on the photosensitive belt are transferred to transfer paper sheets which are fed successively. Alternatively, as disclosed in Japanese Laid-Open Patent Application No. 5-227386, a color image is formed on a first transfer paper sheet held by a transfer drum, which can hold a plurality of transfer paper sheets at a time, based on image data transmitted from an image reading device, and, then, color images are formed on second and following transfer paper sheets based on image data stored in an image memory.

However, when a color image is formed in a manner in which an image, the color of which is a first color (for example, black), is formed using image data transmitted from an image reading apparatus, and, then, images, colors of which are second, third and fourth colors (for example, cyan, magenta and yellow), are formed using image data stored in and read out from an image memory, so that these images are overlaid with each other, timing of a reference signal for positioning an image may be different between the first-color image and the second, third and fourth-color images. Thereby, color displacement may occur.

SUMMARY OF THE INVENTION

The present invention has been devised to solve such a problem, and, an object of the present invention is to provide a color-image forming apparatus in which images, colors of which are respective colors, are overlaid on each other with high accuracy so that color displacement is prevented, and, thereby, it is possible to form high-quality color images.

An image forming apparatus according to the present invention comprises:

- a photosensitive drum turning at a uniform angular velocity;
- means for writing an electrostatic latent image on the photosensitive drum using a laser beam having an intensity in accordance with image data output by an original reading unit which reads an original and outputs the image data thus obtained from the original;
- means for developing the electrostatic latent image formed on the photosensitive drum into a toner image; and
- an intermediate transfer belt running at a uniform speed, onto which the toner image is transferred from the photosensitive drum, a reference mark being provided on the intermediate transfer belt;

- a memory for storing the image data output by the original reading unit;
- means for detecting the reference mark;
- means for counting pulses of a motor driving signal and outputting a count value, the pulses being used for driving a scanner motor provided in the original reading unit at different speeds so as to enable the original to be read in different speeds; and
- means for determining, based on the count value, a time period between a time the detecting means detects the reference mark and a time the writing means starts writing the electrostatic latent image on the photosensitive drum, when the electrostatic latent image is formed using the image data output by the original reading unit directly and the electrostatic latent image is formed using the image data stored and read out from the memory.

An image forming apparatus according to another aspect of the present invention comprises:

- a photosensitive drum turning at a uniform angular velocity;
- means for writing an electrostatic latent image on the photosensitive drum using a laser beam having an intensity in accordance with image data output by an original reading unit which reads an original and outputs the image data thus obtained from the original;
- means for developing the electrostatic latent image formed on the photosensitive drum into a toner image; and
- an intermediate transfer belt running at a uniform velocity, onto which the toner image is transferred from the photosensitive drum, a reference mark being provided on the intermediate transfer belt;
- a memory for storing the image data output by the original reading unit;
- means for detecting the reference mark;
- means for selecting, depending on an arbitrarily set magnification, either pulses of a line synchronization signal or pulses of a motor driving signal, each of the pulses of the line synchronization signal being generated when the laser beam scans the photosensitive drum in a main scan direction and the pulses of the motor driving signal being used for driving a scanner motor provided in the original reading unit at different speeds so as to enable the original to be read at different speeds so as to enable the magnification to be set to different values;
- means for counting the pulses of the signal selected by the selecting means and outputting a count value; and
- means for determining, based on the count value, a time period between a time the detecting means detects the reference mark and a time the writing means starts writing the electrostatic latent image on the photosensitive drum, when the electrostatic latent image is formed using the image data output by the original reading unit directly and the electrostatic latent image is formed using the image data stored and read out from the memory.

When a color image is formed, the electrostatic latent image is formed using the image data output by the original reading unit directly for a first color, and the electrostatic latent image is formed using the image data stored and read out from the image memory for each of second and following colors.

The selecting means may select pulses of one of the line synchronization signal and the motor driving signal, which one is a signal, the distance moved by a carriage of the original reading unit per pulse of the signal being smaller than the distance moved by the carriage of the original reading unit per pulse of the other signal, the carriage being driven by the scanner motor and used for reading the original by moving in a sub-scan direction.

Thereby, as a result of positioning a range in which an electrostatic latent image formed on the photosensitive drum using pulses of one selected between the line synchronization signal (Lsync) and motor driving signal, the thus-selected signal being such that the moving amount of the carriage per pulse of the signal is smaller than the moving amount of the carriage per pulse of the other signal, it is possible to make the range on the intermediate transfer belt in which the toner image is transferred from the photosensitive drum to be the same when the image data obtained from reading the original through the original reading unit is directly used for image formation and image data read out from the memory is used for image formation, with higher accuracy. As a result, it is possible to prevent shift of position and color displacement, and, thereby, to form images on transfer paper sheets at the same position and to form high-quality color images on transfer paper sheets.

Other objects and further features of the present invention will become more apparent from the following detailed description when read in conjunction with the accompanying drawings.

DETAILED DESCRIPTION OF THE PREFERRED EMBODIMENTS

Figure 1:
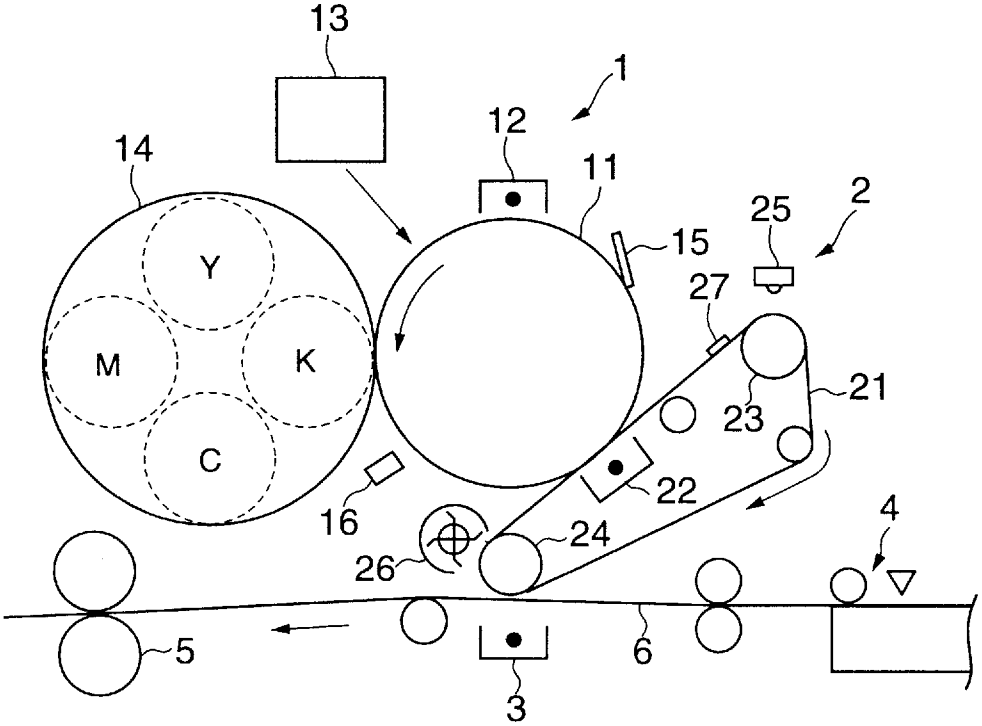
FIG. 1 is a side elevational view showing an arrangement of each embodiment of the present invention.

A color-image forming apparatus according to the present invention includes an image forming unit, a primary transfer unit, a secondary transfer unit, a fixing unit and a paper ejecting unit. In the image forming unit, an electrostatic latent image is formed on a photosensitive drum by a laser beam from an image writing unit, and a visible toner image is formed from the thus-formed electrostatic latent image by a color developing unit. The primary transfer unit includes a an intermediate transfer belt which is cycled on a plurality of tension rollers, a reference position sensor which reads a reference mark provided on the intermediate transfer belt, and a cleaning unit, and the toner image formed on the photosensitive drum is transferred onto the intermediate transfer belt. The intermediate transfer belt may have a length longer than twice that of a standard image size, for example, the A-4 size, and, thus, two toner images, each having the standard image size, may be transferred onto the intermediate transfer belt at the same time. The secondary transfer unit transfers the toner image transferred onto the intermediate transfer belt onto a transfer paper sheet.

A control portion provided in the color-image forming apparatus includes a central control portion which is connected to both an original reading unit and a host interface, processes image data obtained as a result of an original being read by the original reading unit or image data from a host apparatus, and manages operations of the entire apparatus; a transfer control portion which controls operations of the image forming unit, primary transfer unit and secondary transfer unit; and a not-yet-transfer detecting portion and a cleaning-range selecting portion.

When a plurality of copies of a monotone image are formed, the reference mark on the intermediate transfer belt is detected by the reference-position sensor, and, thereby, a pulse of a mark detection signal is output. Then, the central control portion sends a motor driving start signal to the original reading unit. Then, the original reading unit starts driving a scanner motor, reads an original, and, then, transmits image data obtained from reading the original to the central control portion, and, simultaneously, stores the image data in an image memory. The central control portion starts counting pulses of a scanner motor driving signal for driving the scanner motor, or pulses of an appropriately selected one of the scanner motor driving signal and a line synchronization signal Lsync. Then, when the thus-obtained count value reaches a value corresponding to a first predetermined time required until a carriage of the original reading unit reaches the front edge of an original reading range which corresponds to a contact glass of the original reading unit, the central control portion starts an FGATE signal which indicates an effective image range. Thereby, writing onto the photosensitive drum is started, an electrostatic latent image is formed on the photosensitive drum using the image data transmitted from the original reading unit, and, a toner image is formed therefrom, and is transferred onto the intermediate transfer belt. Then, when the above-mentioned count value reaches a value corresponding to a second predetermined time required until the carriage reaches the rear edge of the original reading range, the central control portion negates the FGATE signal, and, thereby, writing onto the photosensitive drum using the image data transmitted from the original reading unit is stopped.

When a second or each of following copies of the image is formed, the reference mark on the intermediate transfer belt is detected by the reference-position sensor, and, thereby, the pulse of the mark detection signal is output. Then, the central control portion starts counting pulses of the scanner motor driving signal, or pulses of an appropriately selected one of the scanner motor driving signal and the line synchronization signal Lsync. Then, when the thus-obtained count value reaches the value corresponding to the above-mentioned first predetermined time, the central control portions starts the FGATE signal again. Thereby, writing onto the photosensitive drum is started, an electrostatic latent image is formed on the photosensitive drum using the image data stored and read out from the image memory, and, a toner image is formed therefrom, and is transferred onto the intermediate transfer belt. Then, when the above-mentioned count value reaches the value corresponding to the predetermined second time, the central control portion negates the FGATE signal, and, thereby, writing onto the photosensitive drum using the image data stored and read out from the image memory is stopped.

FIG. 1 shows an arrangement of each of a color-image forming apparatus in a first embodiment of the present invention and a color-image forming apparatus in a second embodiment of the present invention. As shown in the figure, the color-image forming apparatus includes an image forming unit 1, a primary transfer unit 2, a secondary transfer unit 3, a fixing unit 4 and a paper feeding unit 5. The image forming unit 1 includes a photosensitive drum 11, an electric charger 12 provided in proximity to the photosensitive drum 11, an image writing unit 13, a color developing unit 14 in a rotary type or a fixed type for providing toners, the colors of which are black (K), cyan (C), magenta (M) and yellow (Y), respectively, a drum cleaning unit 15 and a tone sensor 16. In the image forming unit 1, an electrostatic latent image is formed on the photosensitive drum 11 by a laser beam from the writing unit 13, and a visible toner image is formed therefrom by the color developing unit 14. The tone sensor 16 detects the tone of a specific pattern written on the photosensitive drum 11 on which the toner image is formed, and determines whether the toner image is formed in proper tones.

Figure 2:
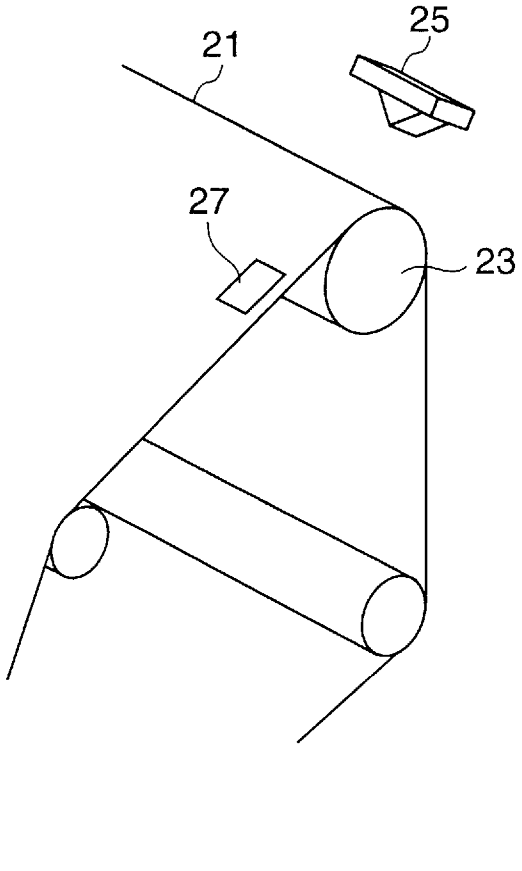
FIG. 2 is a perspective view showing a reference mark on an intermediate transfer belt.

The primary transfer unit 2 includes an intermediate transfer belt 21, a transfer unit 22, a plurality of tension rollers 23, a reference position sensor 25 which reads a reference mark 27 provided on the intermediate transfer belt 21, and a cleaning unit 26. The toner image formed on the photosensitive drum 11 is transferred onto the intermediate transfer belt 21. The intermediate transfer belt 21 may have a length longer than twice that of a standard image size, for example, the A-4 size, and, thus, two toner images, each having the standard image size, may be transferred onto the intermediate transfer belt 21 at the same time. Further, the reference mark 27 is provided on the intermediate transfer belt 21, as shown in FIG. 2. The intermediate transfer belt 21 is apart from the surface of the photosensitive drum 11 at all times other than a time a toner image is transferred from the photosensitive drum 11 onto the intermediate transfer belt 21, by a belt shifting mechanism not shown in the figure. Only when a toner image is transferred from the photosensitive drum 11 onto the intermediate transfer belt 21, the intermediate transfer belt 21 is pressed against the surface of the photosensitive drum 11. The secondary transfer unit 3 transfers a toner image transferred onto the intermediate transfer belt 21 onto a transfer paper sheet 6 fed by the paper feeding unit 4. The fixing unit 5 fixes the toner image transferred onto the transferred paper sheet 6.

Figure 3:
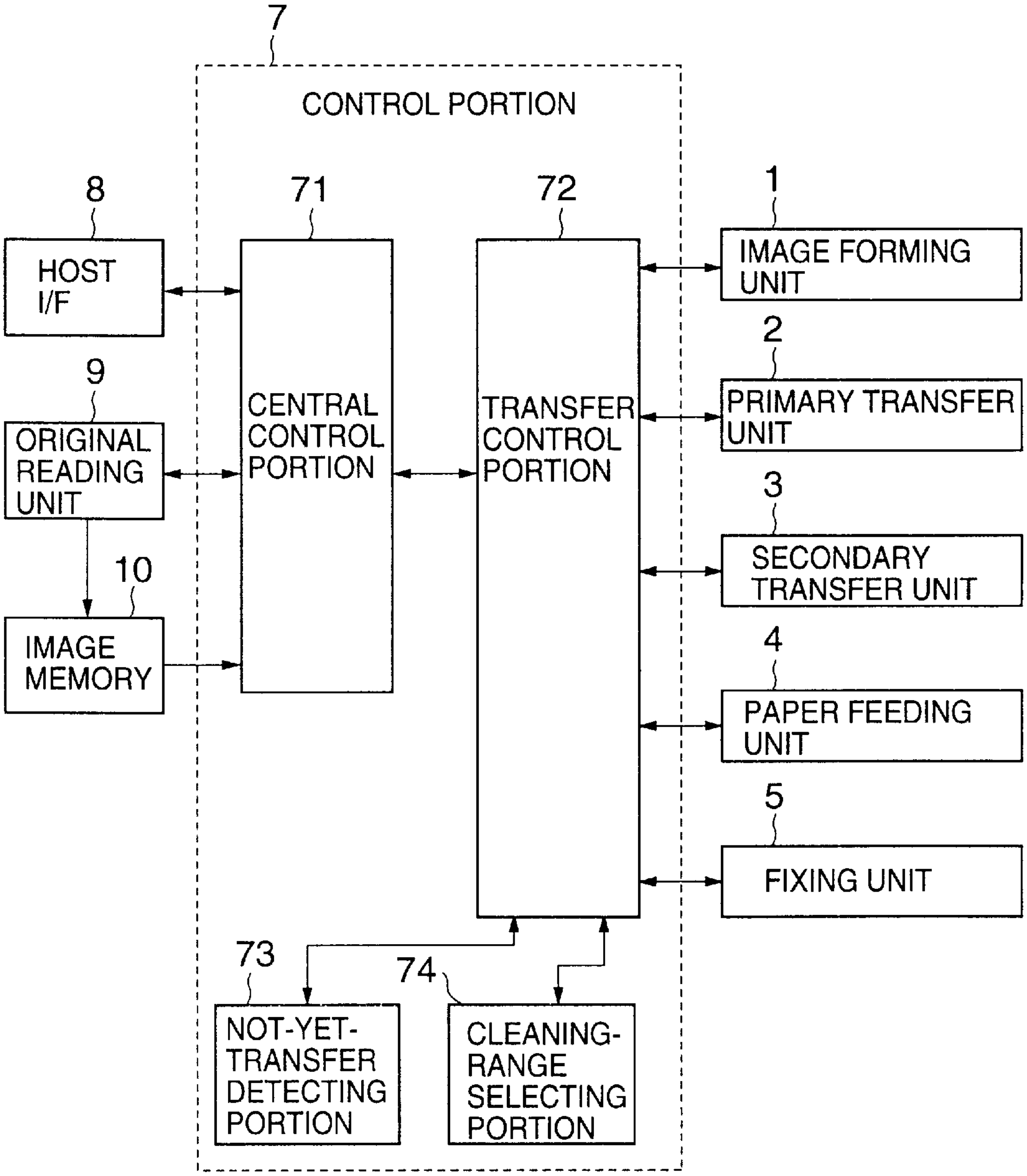
FIG. 3 is a block diagram showing an arrangement of a control portion of each embodiment of the present invention.

A control portion 7 of the color-image forming apparatus is connected with an original reading unit 9, a host interface 8 and an image memory 10, as shown in FIG. 3. The control portion 7 includes a central control portion 71 which processes image data obtained as a result of an original being read by the original reading unit 9 or image data transmitted from a host apparatus via the host interface 8, and manages operations of the entire apparatus; a transfer control portion 72 which controls the image forming unit 1, primary transfer unit 2, secondary transfer unit 3, paper feeding unit 4 and fixing unit 5, a not-yet-transfer detecting portion 73 and a cleaning-range selecting portion 74. The not-yet-transfer detecting portion 73 determines, from control information from the transfer control portion 72, whether any toner image not transferred onto a transfer paper sheet 6 remains on the intermediate transfer belt 21, when paper jam or the like occurs. The cleaning-range selecting portion 74 determines, from the determination result of the not-yet-transfer detecting portion 73, a range on the intermediate transfer belt 21 to be cleaned at a time of recovery after paper jam or the like is dealt with.

Figure 4:
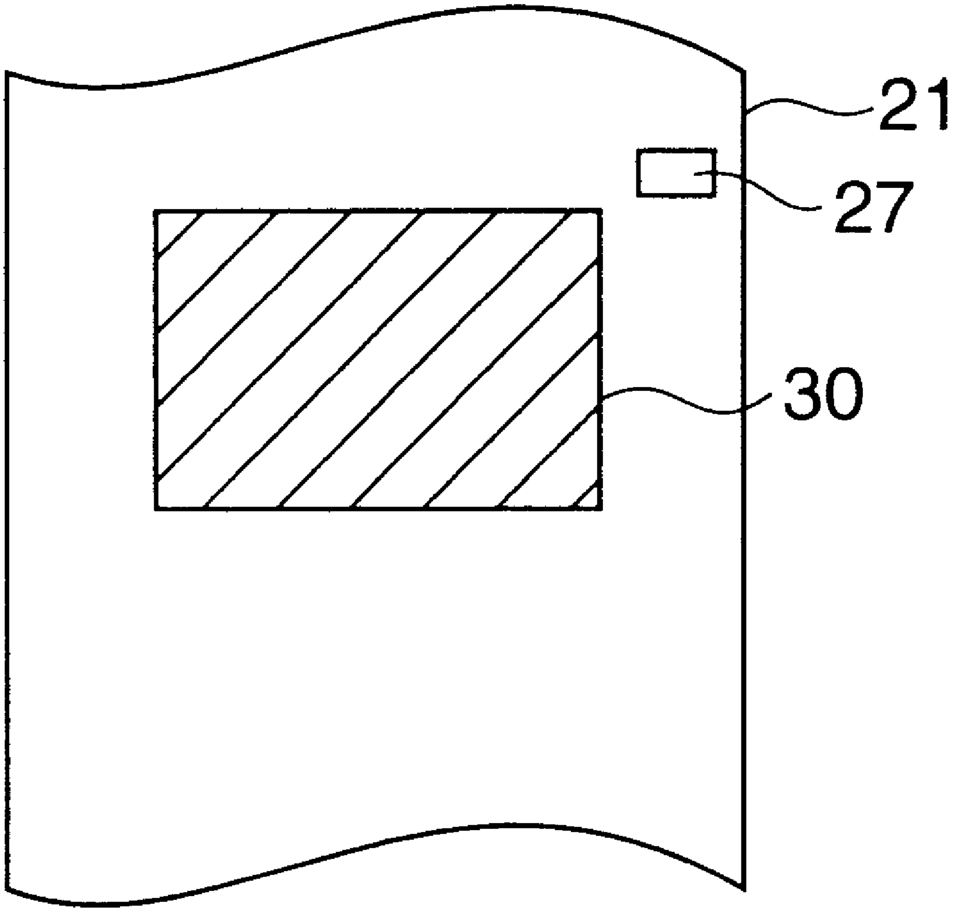
FIG. 4 shows a condition in which a toner image is transferred onto the intermediate transfer belt.

When a cycle of forming an image from image data obtained as a result of an original being read by the original reading unit 9 or from image data transmitted from the host apparatus starts, the central control portion 71 determines from the image data whether an image to be formed is a monotone image or a color image. When the image to be formed is a monotone image, it is not necessary to detect the reference mark 27 on the intermediate transfer belt 21 of the primary transfer unit 2. Therefore, a toner image 30 formed on the photosensitive drum 11 of the image forming unit 1 is transferred to the intermediate transfer belt 21 regardless of the position of the reference mark 27, as shown in FIG. 4. The secondary transfer unit 3 transfers the toner image 30 transferred onto the intermediate transfer belt 21 onto a transfer paper sheet 6 fed in registration with the front edge of the toner image 30. The fixing unit 5 fixes the toner image transferred onto the transfer paper sheet 6 onto the transfer paper sheet 6. The transfer paper sheet 6 onto which the toner image is fixed is ejected into a paper ejection tray. Toner remaining on the intermediate transfer belt 21 is collected by the cleaning unit 26.

When a plurality of copies of a monotone image are formed, image data obtained as a result of an original being read by the original reading unit 9 is transmitted to the central control portion 71, and, simultaneously, is stored in the image memory 10. For a first copy, writing onto the photosensitive drum 11 is performed using the image data obtained as a result of the original being read by the original reading unit 9. For a second copy or each of following copies, writing onto the photosensitive drum 11 is performed using the image data stored and read out from the image memory 10. Then, a toner image 30 formed from an electrostatic latent image thus formed on the photosensitive drum 11 is transferred onto the intermediate transfer belt 21.

Figure 5:
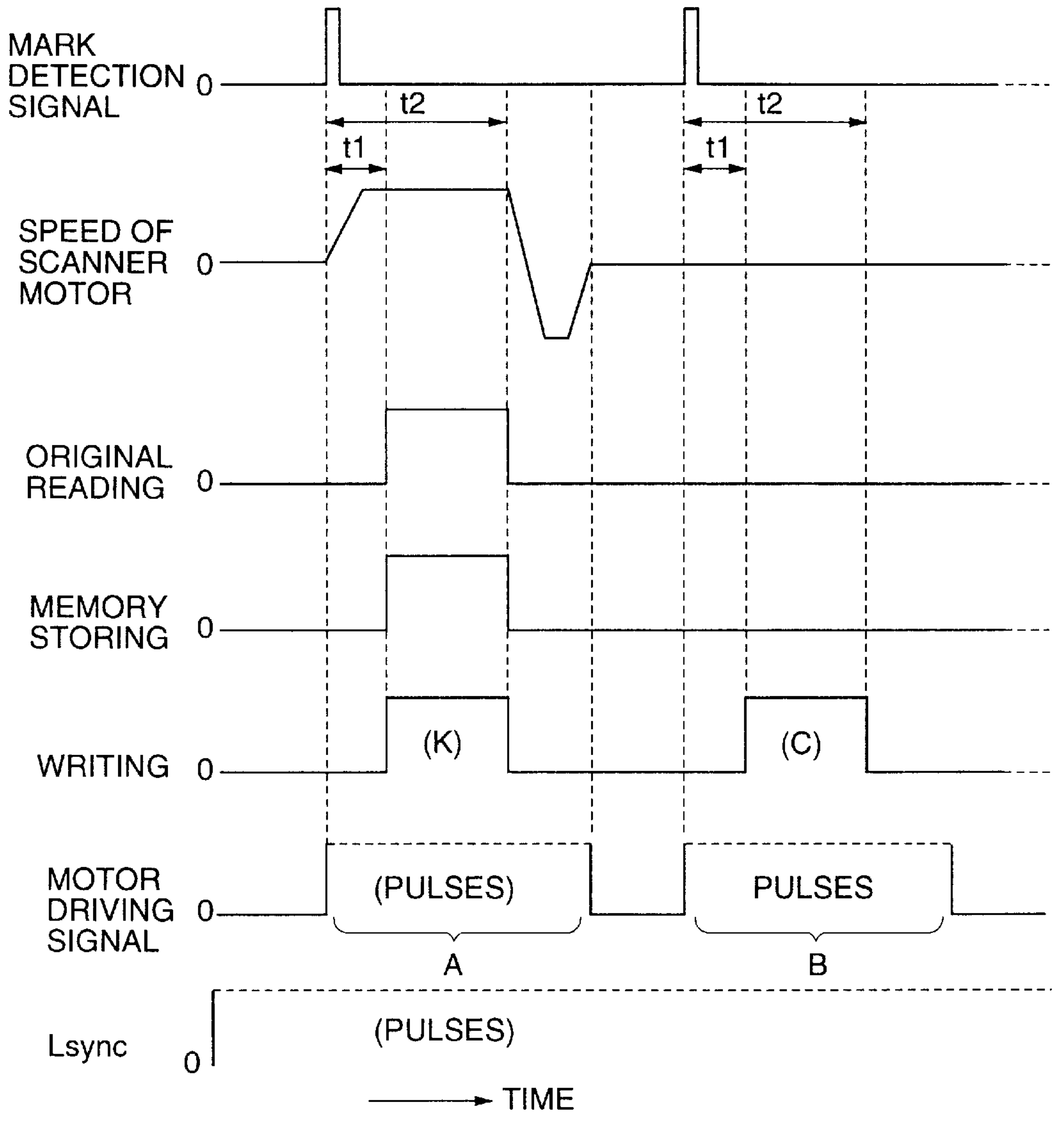
FIG. 5 is a time chart showing operations performed by each embodiment of the present invention when a color image is formed.
Figure 6:
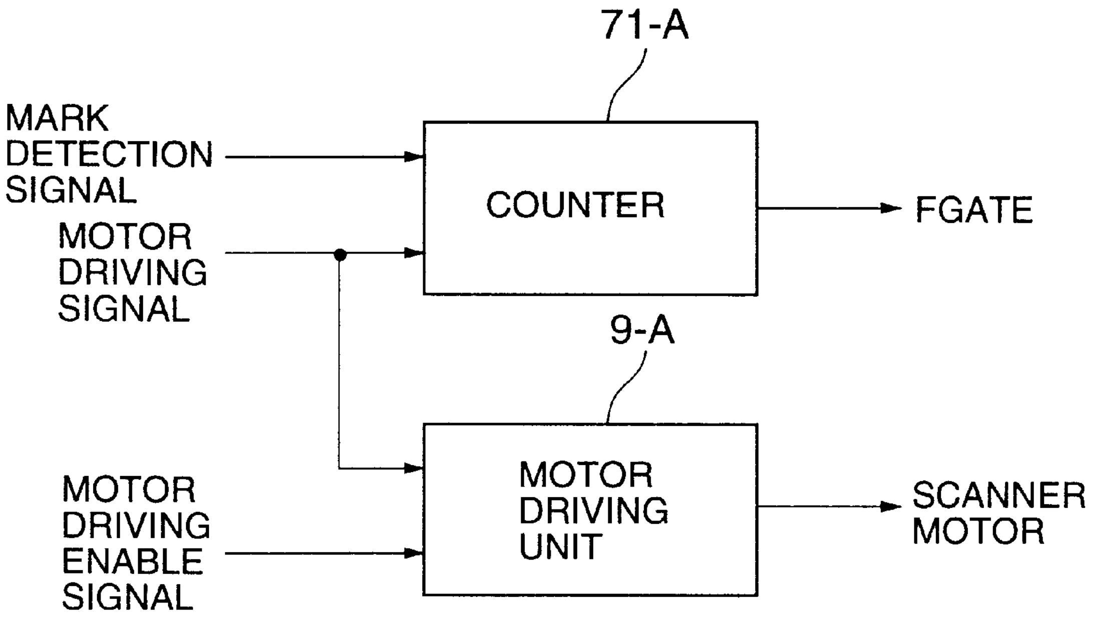
FIG. 6 is a block diagram showing an arrangement included in a first embodiment of the present invention.

When an image to be formed is a color image, as shown in FIG. 5, when the pulse of the mark detection signal is output from the reference position sensor 25 as a result of the reference mark 27 of the intermediate transfer belt 21 being detected by the sensor 25, the central control portion 71 transmits a motor driving start signal to the original reading unit 9. In response thereto, in the original reading unit 9, pulses of a motor driving signal ('motor driving signal', in FIG. 5) are generated by a pulse generating unit (not shown in the figure) in a predetermined pattern (for controlling the speed of the scanner motor as shown in FIG. 5 ('speed of scanner motor')) during a predetermined time period A, and are input to a motor driving unit 9-A shown in FIG. 6. At the same time, in the original reading unit 9, a motor driving enabling unit (not shown in the figure) starts a motor driving enable signal shown in FIG. 6. Thereby, the scanner motor such as a stepper motor is driven by the pulses of the motor driving signal.

Figure 7:
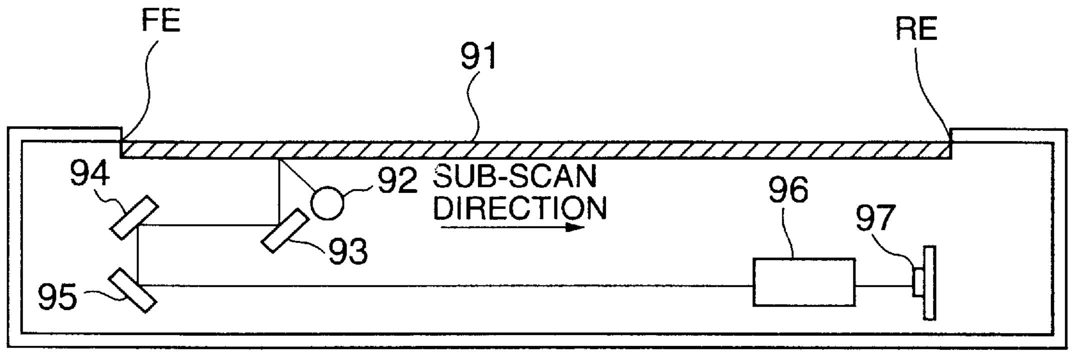
FIG. 7 is a side elevational sectional view of an image reading portion of an original reading unit.
Figure 8:
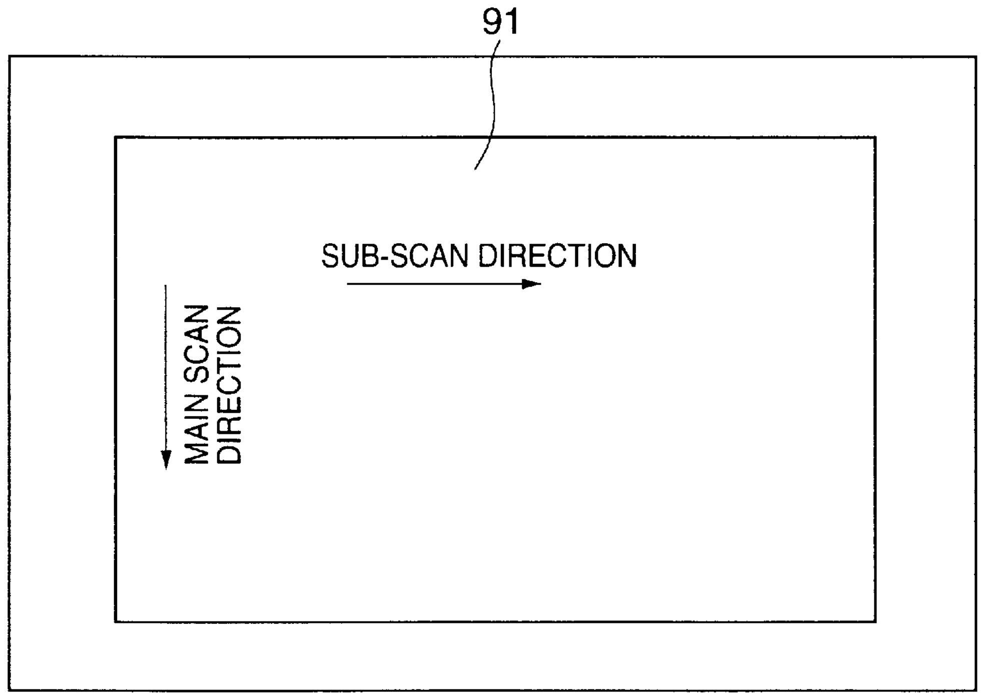
FIG. 8 is a plan view of the image reading portion shown in FIG. 7.

The thus-driven scanner motor drives an image reading mechanism such as that shown in FIG. 7 which shows a side elevational sectional view of an image reading portion of the original reading unit 9. An original is placed on a contact glass 91 and lit by a light source 92. The light reflected by the original is then reflected by a first mirror 93, a second mirror 94 and a third mirror 95, in sequence. Then, the thus-reflected light forms an image on light-reception surfaces of lined light-to-electricity converting elements on a light-to-electricity converting device (color CCD) 97, through a lens 96. The light-to-electricity converting device 97 resolves the thus-formed image into blue image data, green image data and red image data. The thus-obtained color image data are converted into digital data through an A-D converter (not shown in the figure), and, then, are converted into yellow (Y), magenta (M) and cyan (C) image data through a complementary-color converter (not shown in the figure). Then, black (K) image data are extracted from the Y, M and C image data through a black-component extractor (not shown in the figure).

The light source 92 and first mirror 93 are mounted on a first carriage (not shown in the figure). The second mirror 94 and third mirror 95 are mounted on a second carriage (not shown in the figure). The first carriage and second carriage are moved in a sub-scan direction by the above-mentioned scanner motor (not shown in the figure) via wires (not shown in the figure) connected with the scanner motor, wherein the moving speed of the second carriage is half the moving speed of the first carriage.

The counter 71-A of the central control portion 71 starts counting the pulses of the motor driving signal when receiving the pulse of the mark detection signal from the reference position sensor 25. Then, when the thus-obtained count value reaches the value corresponding to the time (t1) required for the above-mentioned carriages to reach such positions that the image reading portion can read an image at the front edge FE of the contact glass 91, the counter 71-A starts the FGATE signal. In response thereto, the central control portion 71 performs predetermined control operations such that the original reading unit 9 starts an image reading operation ('original reading' in FIG. 5), storage of the thus-obtained image data (Y, M, C and K) mentioned above in the image memory 10 is started ('memory storing' in FIG. 5), and writing onto the photosensitive drum 11 using the image data (K) is started ('writing' in FIG. 5). Then, a toner image (K) formed from the thus-formed electrostatic latent image through the developing unit 14 is transferred onto the intermediate transfer belt 21 from the photosensitive drum 11.

Then, when the count value of the counter 71-A reaches the value corresponding to the time (t2) required for the above-mentioned carriages to reach such positions that the image reading portion can read an image at the rear edge RE of the contact glass 91, the counter 71-A negates the FGATE signal so that the original reading unit 9 stops the image reading operation ('original reading' in FIG. 5), storage of the thus-obtained image data (Y, M, C and K) mentioned above in the image memory 10 is finished ('memory storing' in FIG. 5), and writing onto the photosensitive drum 11 using the image data (K) is finished ('writing' in FIG. 5).

Then, when the reference position sensor 25 again detects the reference mark 27 of the intermediate transfer belt 21 as a result of the intermediate transfer belt 21 running to make one round, the central control portion 71 transmits the motor driving start signal to the original reading unit 9. In response thereto, in the original reading unit 9, the pulses of the scanner-motor driving signal ('motor driving signal', in FIG. 5) are generated by the pulse generating unit during a time period B the same as the above-mentioned time period A in the same pattern as that of the pulses generated during the time period A, and are input to the motor driving unit 9-A shown in FIG. 6. At this time, in the original reading unit 9, the motor driving enable signal generating unit negates the motor driving enable signal shown in FIG. 6. As a result, the scanner motor is not driven, and the image reading portion of the original reading unit 9 does not perform the image reading operation.

The counter 71-A of the central control portion 71 again starts counting (from 1) the pulses of the motor driving signal when receiving the pulse of the mark detection signal from the reference position sensor 25. Then, when the thus-obtained count value reaches the above-mentioned value corresponding to the above-mentioned time t1, the counter 71-A starts the FGATE signal. In response thereto, the central control portion 71 performs other predetermined control operations such that reading of the image data (C) stored in the image memory 10 is started and writing onto the photosensitive drum 11 using the thus-read image data (C) is started ('writing' in FIG. 5). Then, a toner image (C) formed from the thus-formed electrostatic latent image through the developing unit 14 is transferred onto the intermediate transfer belt 21 from the photosensitive drum 11.

At this time, the photosensitive drum 11 turns at a constant angular velocity, the intermediate transfer belt 21 runs at a constant speed, the time period t1 between the detection of the reference mark 27 of the intermediate transfer belt 21 and the starting of writing onto the photosensitive drum 11 using the image data is the same when the image (K) is formed and the image (C) is formed, and the time period between the starting of writing onto the photosensitive drum 11 using the image data and the starting of transferring of the toner image thus formed on the photosensitive drum 11 onto the intermediate transfer belt 21 is fixed. As a result, the toner image (C) is transferred onto the intermediate transfer belt 21 at the same position as that at which the toner image (K) is transferred onto the intermediate transfer belt 21.

Then, when the count value of the counter 71-A reaches the above-mentioned value corresponding to the above-mentioned time t2, the counter 71-A negates the FGATE signal so that reading of the image data from the image memory 10 and writing onto the photosensitive drum 11 using the image data is stopped ('writing' in FIG. 5).

Then, in the same manner, using the image data (M) stored in and read out from the image memory 10, an electrostatic latent image (M) is formed on the photosensitive drum 11, a toner image (M) is formed therefrom and is transferred onto the intermediate transfer belt 21 at the same position as that at which the toner image (K) and toner image (C) are transferred onto the intermediate transfer belt 21. Then, in the same manner, using the image data (Y) stored in and read out from the image memory 10, an electrostatic latent image (Y) is formed on the photosensitive drum 11, a toner image (Y) is formed therefrom and is transferred onto the intermediate transfer belt 21 at the same position as that at which the toner image (K), toner image (C) and toner image (M) are transferred onto the intermediate transfer belt 21.

Thus, the full-color toner image is obtained on the intermediate transfer belt 21 as a result of the black toner image (K), cyan toner image (C), magenta toner image (M) and yellow toner image (Y) being laid one on top of another at the same position. The thus-obtained full-color toner image is transferred onto a transfer paper sheet and fixed thereon.

Figure 9:
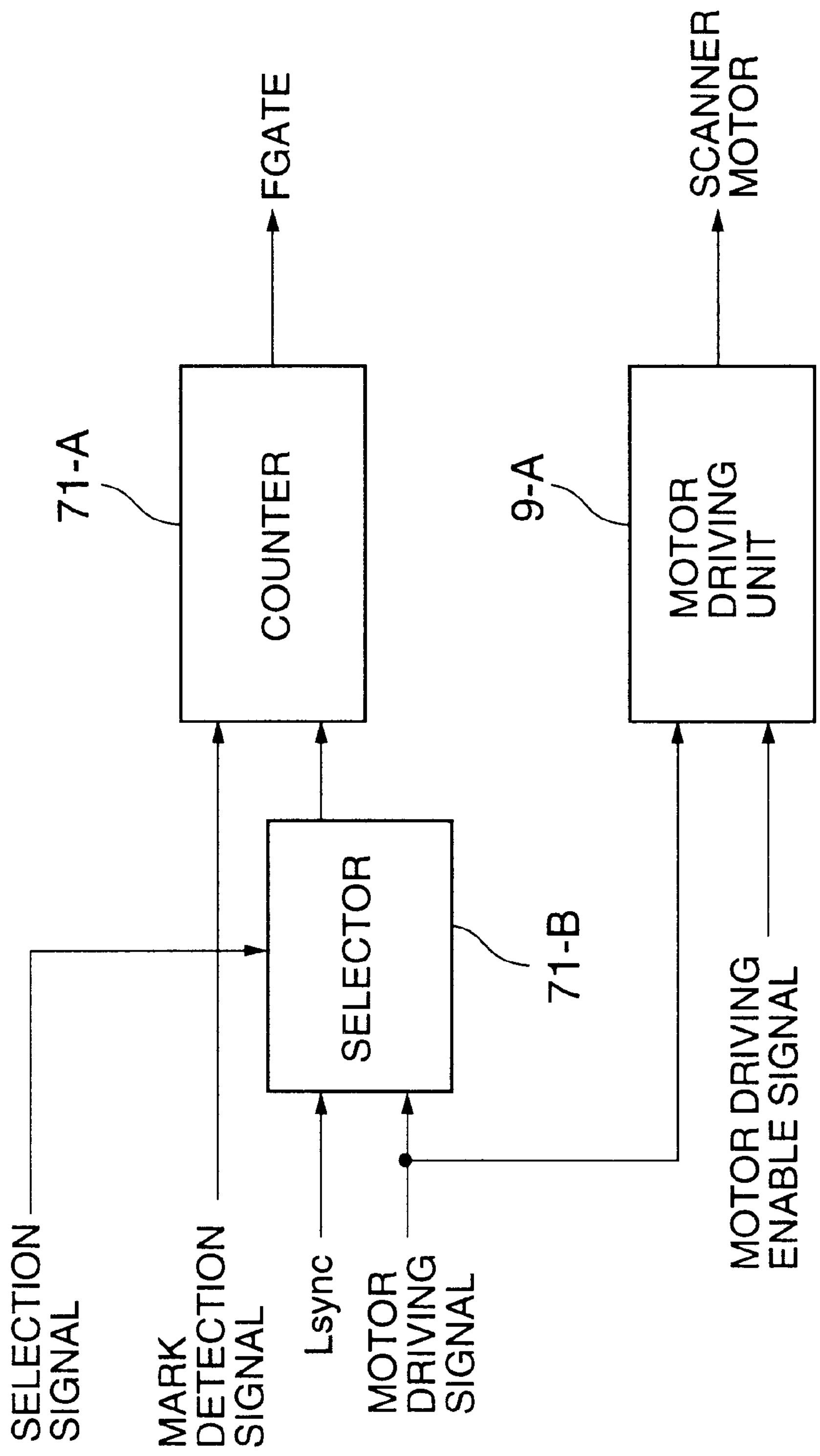
FIG. 9 is a block diagram showing an arrangement included in a second embodiment of the present invention.

The second embodiment of the present invention will now be described. The second embodiment is the same as the above-described first embodiment except that a selector 71-B is added as shown in FIG. 9. The selector 71-B selects one of the Lsync (line synchronization signal) and the motor driving signal in accordance with a selection signal. When the motor driving signal is selected, the counter 71-A counts pulses of the motor driving signal as described above for measuring the times t1 and t2 shown in FIG. 5. However, when the Lsync is selected, the counter 71-A counts pulses of the Lsync instead of pulses of the motor driving signal for the same purpose.

Figures 10, 11:
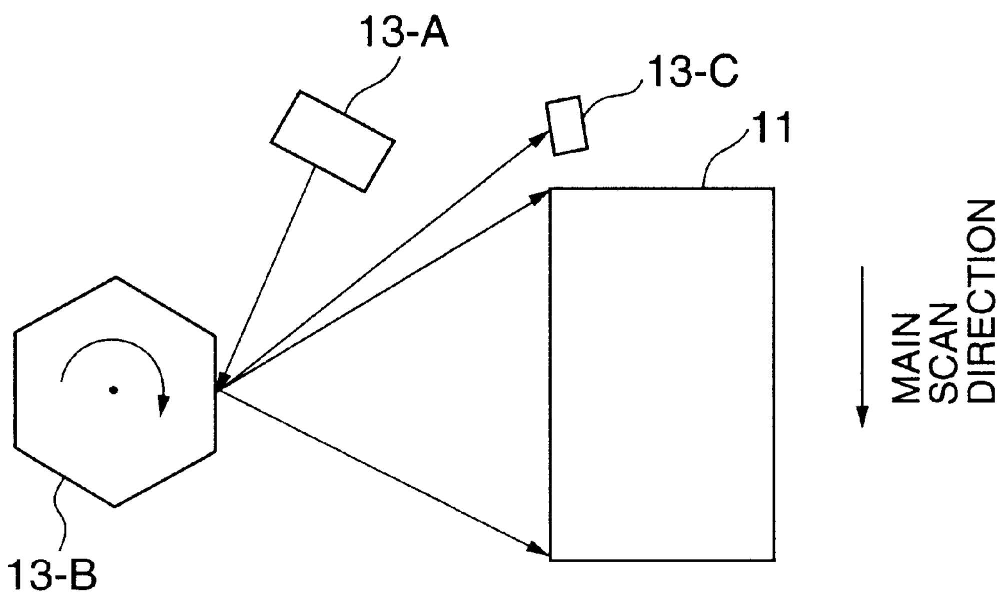
FIG. 10 shows a partial arrangement of an image forming unit 1 of the image forming apparatus shown in FIG. 1.
FIG. 11 shows a distance (mm) moved by a first carriage per pulse of a line synchronization signal and a motor driving signal for set magnifications of 25, 100 and 400%.

FIG. 10 shows a partial arrangement of an image forming unit 1 of the image forming apparatus shown in FIG. 1. As shown in the figure, a laser diode 13-A emits a laser beam having an intensity in accordance with the image data, which beam is reflected by a rotating polygon mirror 13-B so that the laser beam scans the surface of the photosensitive drum 11 in a main scan direction. A sensor 13-C is provided for detecting the laser beam and outputs a pulse (BD signal) each time the laser beam scans the photosensitive drum 11 in the main scan direction. The thus-obtained pulses are pulses of the above-mentioned Lsync.

When an original is read through the original reading unit 9, and an image is formed using thus-obtained image data and transferred onto a transfer paper sheet 6 in the image forming apparatus as described above, the period of pulses of the line synchronization signal Lsync does not change but the period of pulses of the motor driving signal changes as a set magnification changes, the size of a read image being magnified or reduced in accordance with the set magnification so that thus-magnified/reduced-size image is formed and transferred onto a transfer paper sheet. As the period of pulses of the motor driving signal changes, the speed of the above-mentioned first carriage driven by the scanner motor changes. Specifically, when the size of a read image is magnified, the speed of the first carriage is low, and when the size of a read image is reduced, the speed of the first carriage is high. Further, the scanner motor (stepper motor) operates in either a full-step mode or a half-step mode. The distance moved by the first scanner per pulse of the motor driving signal when the scanner motor operates in the half-step mode is half the distance moved by the first carriage when the scanner motor operates in the full-step mode. FIG. 11 is a table showing the distance (mm) moved by the first carriage per pulse of the Lsync and motor driving signal for the set magnifications of 25, 100 and 400%.

Further, for the set magnification in the range of 25 to 99%, the scanner motor operates in the full-step mode (so that the distance moved by the first carriage per pulse of the motor driving signal is 0.10 mm), and, for the set magnification in the range of 100 to 400%, the scanner motor operates in the half-step mode (so that the distance moved by the first carriage per pulse of the motor driving signal is 0.05 mm). Therefore, the period of pulses of the motor driving signal for the magnification of 25% is ½ the period of pulses of the motor driving signal for the magnification of 100%, and the period of pulses of the motor driving signal for the magnification of 100% is ¼ the period of pulses of the motor driving signal for the magnification of 400%. Accordingly, for example, assuming that the period of pulses of the motor driving signal for the magnification of 100% is 400 $\mu$m, the period of pulses of the motor driving signal for the magnification of 25% is 200 $\mu$m , and the period of pulses of the motor driving signal for the magnification of 400% is 800 $\mu$m.

Therefore, the distance moved by the first carriage per pulse of the Lsync is smaller than the distance moved by the first carriage per pulse of the motor driving signal, when the set magnification is equal to or more than 42% such that the distance moved by the first carriage per pulse of the Lsync is equal to or less than 0.10 mm. It is possible to measure the above-mentioned times t1 and t2 with higher accuracy so as to position a toner image transferred onto the intermediate transfer belt 21 with higher accuracy by selecting pulses of such a signal that the distance moved by the first carriage per pulse of the thus-selected signal is smaller than the distance moved by the first carriage per pulse of the other signal. Specifically, in this case, it is possible to measure the above-mentioned times t1 and t2 with higher accuracy so as to position a toner image transferred onto the intermediate transfer belt 21 with higher accuracy by selecting pulses of the Lsync when the set magnification is equal to or more than 42%, and pulses of the motor driving signal when the set magnification is less than 42%.

Figure 12:
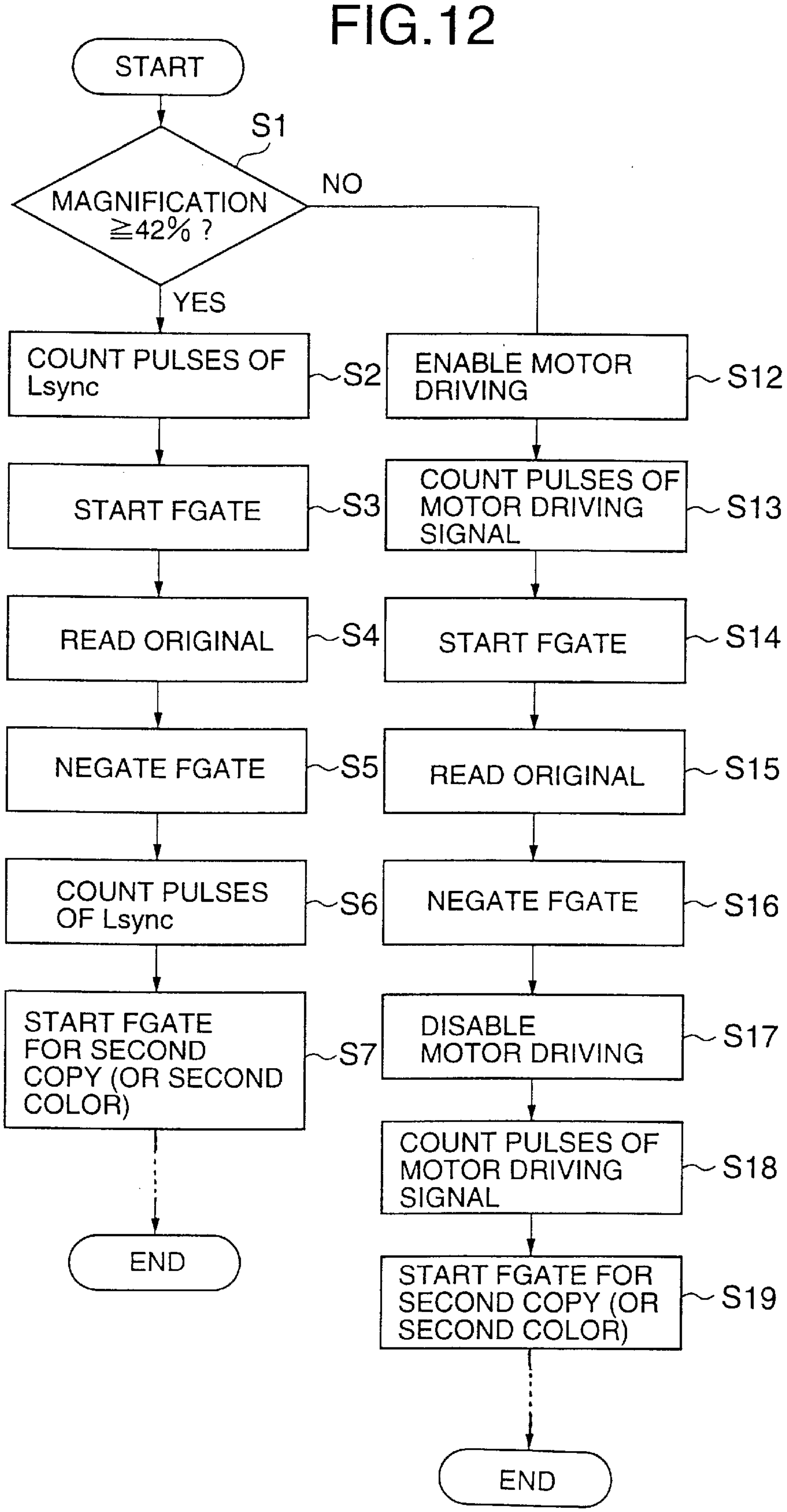
FIG. 12 is a flow chart showing operations of the second embodiment of the present invention.

FIG. 12 is a flow chart showing the operations of the second embodiment using the arrangement shown in FIG. 9.

In a step S1, the central control portion 71 determines whether the set magnification is equal to or more than 42%. When the set magnification is equal to or more than 42%, the central control portion 71 transmits a selection signal to the selector 71-B such that the selector 71-B selects pulses of the Lsync, and, therefore, the counter 71-A counts pulses of the Lsync after receiving the mark detection signal, in a step S2. Then, in a step S3, the counter 71-A starts the FGATE signal, for a first copy (or for a first color) when the count value reaches the value corresponding to the above-mentioned time t1. Thereby, in a step S4, the original reading unit 9 reads a set original (in this time, the motor driving enable signal input to the motor driving unit 9-A is started and pulses of the motor driving signal drive the scanner motor), obtains image data therefrom, and transmits the image data to the central control portion 71 and to the image memory 10 in which the image data is then stored.

Then, the transfer control portion 72 performs control operations such that the image forming unit 1 forms an electrostatic latent image on the photosensitive drum 11 using the image data for the first copy (or for the first color) in synchronization with the FGATE signal, the primary transfer unit 2 transfers a toner image formed from the electrostatic latent image from the photosensitive drum 11 onto the intermediate transfer belt 21. When the count value of the counter 71-A reaches the value corresponding to the above-mentioned time t2, the counter 71-A negates the FGATE signal in a step S5, and, thereby, the writing onto the photosensitive drum 11 directly using the image data obtained from reading the original is stopped.

Then, the counter 71-A again counts (from 1) pulses of the Lsync after again receiving the mark detection signal, in a step S6. Then, in a step S7, the counter 71-A starts the FGATE signal, for a second copy (or for a second color) when the count value reaches the value corresponding to the time t1. Thereby, the transfer control portion 72 performs control operations such that the image forming unit 1 forms an electrostatic latent image on the photosensitive drum 11 using the image data for the second copy (or for the second color) read from the image memory 10 in synchronization with the FGATE signal, the primary transfer unit 2 transfers a toner image formed from the electrostatic latent image from the photosensitive drum 11 onto the intermediate transfer belt 21. When the count value of the counter 71-A reaches the value corresponding to the time t2, the counter 71-A negates the FGATE signal, and, thereby, the writing onto the photosensitive drum 11 using the image data read from the image memory 10 for the second copy (or for the second color) is stopped. These operations are repeated for a predetermined number of copies (or for a predetermined number of colors).

When the set magnification is less than 42% in the step 1, the above-mentioned motor driving enabling unit starts the motor driving enabling signal input to the motor driving unit 9-A, in a step S12. In a step 13, the central control portion 71 transmits a selection signal to the selector 71-B such that the selector 71-B selects pulses of the motor driving signal, and, therefore, the counter 71-A counts pulses of the motor driving signal after receiving the pulse of the mark detection signal (by which pulse generation of pulses of the motor driving signal is already started, and the pulses of the motor driving signal drive the scanner motor, as mentioned above using FIG. 5), in a step S13. In a step S14, the counter 71-A starts the FGATE signal, for a first copy (or for a first color), when the count value reaches the value corresponding to the time t1. Thereby, in a step S15, the original reading unit 9 reads a set original, obtains image data therefrom, and transmits the image data to the central control portion 71 and to the image memory 10 in which the image data is then stored.

Then, the transfer control portion 72 performs control operations such that the image forming unit 1 forms an electrostatic latent image on the photosensitive drum 11 using the image data for the first copy (or for the first color) in synchronization with the FGATE signal, the primary transfer unit 2 transfers a toner image formed from the electrostatic latent image from the photosensitive drum 11 onto the intermediate transfer belt 21. When the count value of the counter 71-A reaches the value corresponding to the time t2, the counter 71-A negates the FGATE signal in a step S16, and, thereby, the writing onto the photosensitive drum 11 directly using the image data obtained from reading the original is stopped. Then, the motor driving enabling unit negates the motor driving enable signal in a step S17.

Then, the counter 71-A again counts (from 1) pulses of the motor driving signal after again receiving the pulse of the mark detection signal (by which pulse generation of pulses of the motor driving signal is already started, but the pulses of the motor driving signal do not drive the scanner motor because the motor driving enable signal is negated in the step 17), as mentioned above using FIG. 5), in a step S18. Then, in a step S19, the counter 71-A starts the FGATE signal, for a second copy (or for a second color) when the count value reaches the value corresponding to the time t1. Thereby, the transfer control portion 72 performs control operations such that the image forming unit 1 forms an electrostatic latent image on the photosensitive drum 11 using the image data for the second copy (or for the second color) read from the image memory 10 in synchronization with the FGATE signal, the primary transfer unit 2 transfers a toner image formed from the electrostatic latent image from the photosensitive drum 11 onto the intermediate transfer belt 21. When the count value of the counter 71-A reaches the value corresponding to the time t2, the counter 71-A negates the FGATE signal, and, thereby, the writing onto the photosensitive drum 11 using the image data read from the image memory 10 for the second copy (or for the second color) is stopped. These operations are repeated for a predetermined number of copies (or for a predetermined number of colors).

Thus, as a result of positioning a range in which an electrostatic latent image formed on the photosensitive drum 11 using pulses of one selected between the Lsync and motor driving signal, the thus-selected signal being such that the moving amount of the first carriage per pulse of the signal is smaller than the moving amount of the first carriage per pulse of the other signal, it is possible to make the range on the intermediate transfer belt 21 in which a toner image is transferred from the photosensitive drum 11 to be the same when image data obtained from reading an original is directly used for image formation and image data read out from the image memory 10 is used for image formation, with higher accuracy. As a result, it is possible to prevent shift of position and color displacement, and, thereby, to form images on transfer paper sheets 6 at the same position and to form a high-quality color image on a transfer paper sheet 6.

Figure 13:
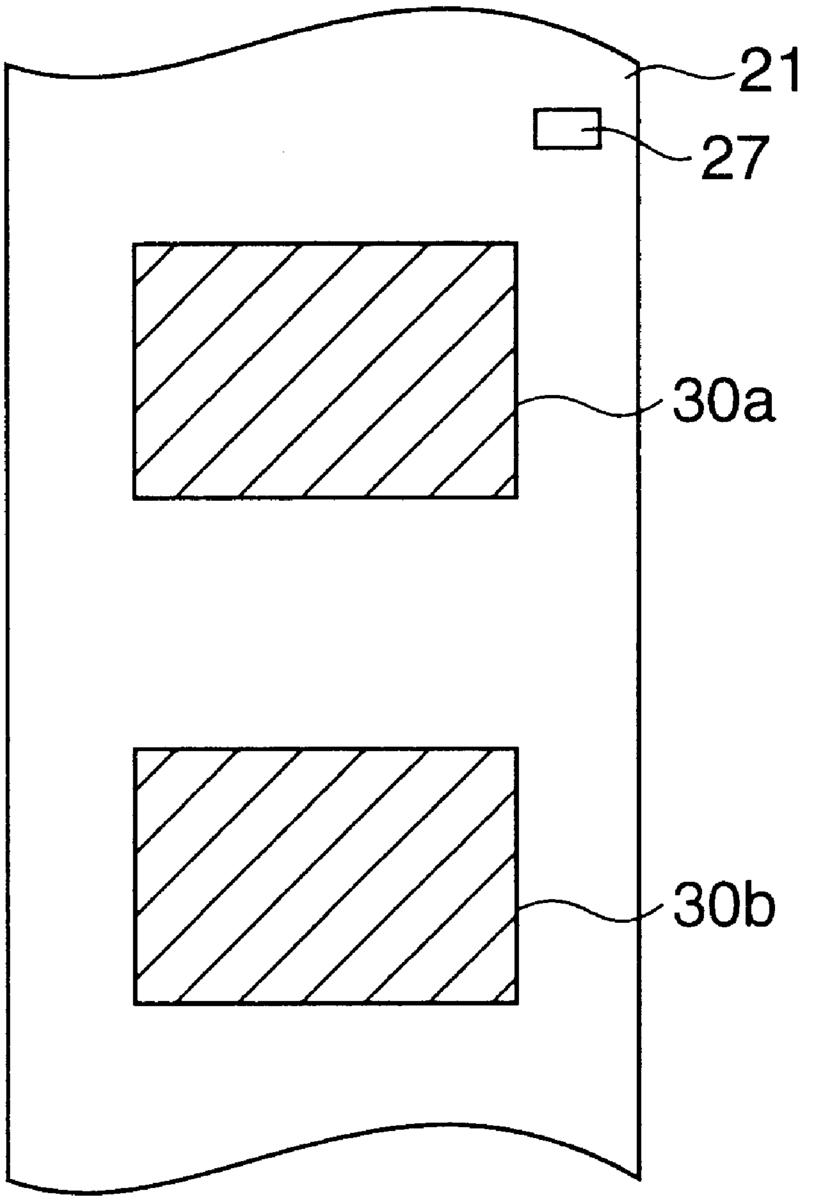
FIG. 13 shows a condition in which two toner images are transferred onto the intermediate transfer belt.
Figure 14:
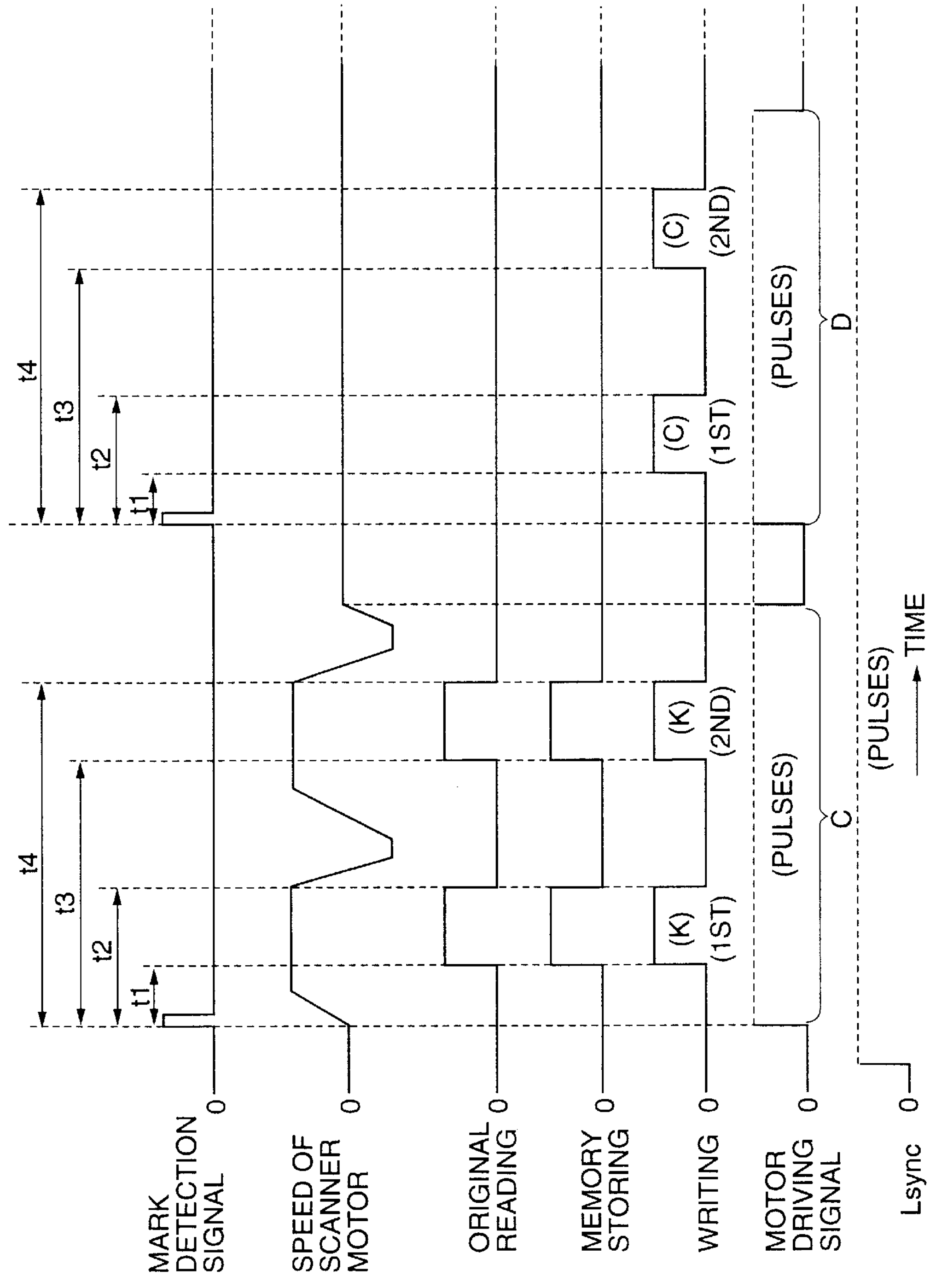
FIG. 14 is a time chart showing operations performed by each embodiment of the present invention when two color images are formed at the same time.

A case will now be considered where two originals, each having, for example, the A-4 size, are fed, by a well-known automatic original feeding mechanism, to and set on the original reading unit 9 one by one, and, therefrom, corresponding two toner images 30*a* and 30*b* are transferred onto the intermediate transfer belt 21 at the same time, as shown in FIG. 13. In such a case, in the first embodiment using the arrangement shown in FIG. 6, when each image to be formed is a color image, as shown in FIG. 14, when the pulse of the mark detection signal is output from the reference position sensor 25 as a result of the reference mark 27 of the intermediate transfer belt 21 being detected by the sensor 25, the central control portion 71 transmits the motor driving start signal to the original reading unit 9. In response thereto, in the original reading unit 9, pulses of the motor driving signal ('motor driving signal', in FIG. 14) are generated by the pulse generating unit (not shown in the figure) in a predetermined pattern (for controlling the speed of the scanner motor as shown in FIG. 14 ('speed of scanner motor')) during a predetermined time period C, and are input to the motor driving unit 9-A shown in FIG. 6. At the same time, in the original reading unit 9, the motor driving enabling unit starts the motor driving enable signal shown in FIG. 6. Thereby, the scanner motor is driven by the pulses of the motor driving signal.

The thus-driven scanner motor drives the above-mentioned image reading mechanism. The counter 71-A of the central control portion 71 starts counting the pulses of the motor driving signal when receiving the pulse of the mark detection signal from the reference position sensor 25. Then, when the thus-obtained count value reaches the value corresponding to the time (t1) required for the above-mentioned carriages to reach such positions that the image reading portion can read an image at the front edge FE of the contact glass 91, the counter 71-A starts the FGATE signal. In response thereto, the central control portion 71 performs predetermined control operations such that the original reading unit 9 starts the image reading operation ('original reading' in FIG. 14) for reading the first original, storage of the thus-obtained image data (Y, M, C and K) mentioned above in the image memory 10 is started ('memory storing' in FIG. 14), and writing onto the photosensitive drum 11 using the image data (K) is started ('writing' in FIG. 14). Then, a toner image (K) formed from the thus-formed electrostatic latent image through the developing unit 14 is transferred onto the intermediate transfer belt 21 from the photosensitive drum 11.

Then, when the count value of the counter 71-A reaches the value corresponding to the time (t2) required for the above-mentioned carriages to reach such positions that the image reading portion can read an image at the rear edge RE of the contact glass 91, the counter 71-A negates the FGATE signal so that the original reading unit 9 finishes the image reading operation ('original reading' in FIG. 14) for reading the first original, storage of the thus-obtained image data (Y, M, C and K) mentioned above in the image memory 10 is finished ('memory storing' in FIG. 14), and writing onto the photosensitive drum 11 using the image data (K) is finished ('writing' in FIG. 14).

Then, when the count value of the counter 71-A reaches the value corresponding to the time (t3) required for the above-mentioned carriages to again reach the above-mentioned positions such that the image reading portion can read an image at the front edge FE of the contact glass 91 after returning to the home position, the counter 71-A starts the FGATE signal again. In response thereto, the central control portion 71 performs again the above-mentioned predetermined control operations such that the original reading unit 9 again starts the image reading operation ('original reading' in FIG. 14) for reading the second original (placed on the contact glass 91 after the first original is removed therefrom by the above-mentioned automatic original feeding mechanism), storage of the thus-obtained image data (Y, M, C and K) mentioned above in the image memory 10 is started ('memory storing' in FIG. 14), and writing onto the photosensitive drum 11 using the image data (K) is started ('writing' in FIG. 14). Then, a toner image (K) formed from the thus-formed electrostatic latent image through the developing unit 14 is transferred onto the intermediate transfer belt 21 from the photosensitive drum 11 at a position (30*b*) different from the position (30*a*) of the toner image obtained from the first original, as shown in FIG. 13.

Then, when the count value of the counter 71-A reaches the value corresponding to the time (t3) required for the above-mentioned carriages to reach the above-mentioned positions such that the image reading portion can read an image at the rear edge RE of the contact glass 91, the counter 71-A negates the FGATE signal so that the original reading unit 9 finishes the image reading operation ('original reading' in FIG. 14) for reading the second original, storage of the thus-obtained image data (Y, M, C and K) mentioned above in the image memory 10 is finished ('memory storing' in FIG. 14), and writing onto the photosensitive drum 11 using the image data (K) is finished ('writing' in FIG. 14).

Then, when the reference position sensor 25 again detects the reference mark 27 of the intermediate transfer belt 21 as a result of the intermediate transfer belt 21 running to make one round, the central control portion 71 transmits the motor driving start signal to the original reading unit 9. In response thereto, in the original reading unit 9, the pulses of the scanner-motor driving signal ('motor driving signal', in FIG. 14) are generated by the pulse generating unit during a time period D the same as the above-mentioned time period C in the same pattern as that of the pulses generated during the time period C, and are input to the motor driving unit 9-A shown in FIG. 6. At this time, in the original reading unit 9, the motor driving enable signal generating unit negates the motor driving enable signal shown in FIG. 6. As a result, the scanner motor is not driven, and the image reading portion of the original reading unit 9 does not perform the image reading operation.

The counter 71-A of the central control portion 71 again starts counting the pulses of the motor driving signal when receiving the pulse of the mark detection signal from the reference position sensor 25. Then, when the thus-obtained count value reaches the above-mentioned value corresponding to the above-mentioned time t1, the counter 71-A starts the FGATE signal. In response thereto, the central control portion 71 performs other predetermined control operations such that reading of the image data (C) obtained from the first original and stored in the image memory 10 is started and writing onto the photosensitive drum 11 using the thus-read image data (C) is started ('writing' in FIG. 14). Then, a toner image (C) formed from the thus-formed electrostatic latent image through the developing unit 14 is transferred onto the intermediate transfer belt 21 from the photosensitive drum 11.

At this time, the photosensitive drum 11 turns at the constant angular velocity, the intermediate transfer belt 21 runs at the constant speed, the time period t1 between the detection of the reference mark 27 of the intermediate transfer belt 21 and the starting of writing onto the photosensitive drum 11 using the image data obtained from the first original is the same when the image (K) is formed and the image (C) is formed, and the time period between the starting of writing onto the photosensitive drum 11 using the image data and the starting of transferring the toner image thus formed on the photosensitive belt 11 is fixed. As a result, the toner image (C) obtained from the first original is transferred onto the intermediate transfer belt 21 at the same position as that at which the toner image (K) obtained from the first original is transferred onto the intermediate transfer belt 21.

Then, when the count value of the counter 71-A reaches the above-mentioned value corresponding to the above-mentioned time t2, the counter 71-A negates the FGATE signal so that reading the image data (obtained from the first original) from the image memory 10 and writing onto the photosensitive drum 11 using the image data is finished ('writing' in FIG. 14).

Then, when the count value of the counter 71-A reaches the above-mentioned value corresponding to the above-mentioned time t3, the counter 71-A starts the FGATE signal. In response thereto, the central control portion 71 performs the above-mentioned other predetermined control operation such that reading of the image data (C) obtained from the second original and stored in the image memory 10 is started and writing onto the photosensitive drum 11 using the thus-read image data (C) is started ('writing' in FIG. 14). Then, a toner image (C) formed from the thus-formed electrostatic latent image through the developing unit 14 is transferred onto the intermediate transfer belt 21 from the photosensitive drum 11.

At this time, the photosensitive drum 11 turns at the constant angular velocity, the intermediate transfer belt 21 runs at the constant speed, the time period t3 between the detection of the reference mark 27 of the intermediate transfer belt 21 and the starting of writing onto the photosensitive drum 11 using the image data obtained from the second original is the same when the image (K) is formed and the image (C) is formed, and the time period between the starting of writing onto the photosensitive drum 11 using the image data and the starting of transferring the toner image thus formed on the photosensitive belt 11 is fixed. As a result, the toner image (C) obtained from the second original is transferred onto the intermediate transfer belt 21 at the same position as that at which the toner image (K) obtained from the second original is transferred onto the intermediate transfer belt 21.

Then, when the count value of the counter 71-A reaches the above-mentioned value corresponding to the above-mentioned time t4, the counter 71-A negates the FGATE signal so that reading of the image data (obtained from the second original) from the image memory 10 and writing onto the photosensitive drum 11 using the image data is finished ('writing' in FIG. 14).

Then, in the same manner, using the image data (M) (obtained from the first original) stored in and read out from the image memory 10, an electrostatic latent image (M) is formed on the photosensitive drum 11, a toner image (M) is formed therefrom and is transferred onto the intermediate transfer belt 21 at the same position as that at which the toner image (K) (obtained from the first original) and toner image (C) (obtained from the first original) are transferred onto the intermediate transfer belt 21. Then, using the image data (M) (obtained from the second original) stored in and read out from the image memory 10, an electrostatic latent image (M) is formed on the photosensitive drum 11, a toner image (M) is formed therefrom and is transferred onto the intermediate transfer belt 21 at the same position as that at which the toner image (K) (obtained from the second original) and toner image (C) (obtained from the second original) are transferred onto the intermediate transfer belt 21.

Then, in the same manner, using the image data (Y) (obtained from the first original) stored in and read out from the image memory 10, an electrostatic latent image (Y) is formed on the photosensitive drum 11, a toner image (Y) is formed therefrom and is transferred onto the intermediate transfer belt 21 at the same position as that at which the toner image (K) (obtained from the first original), toner image (C) (obtained from the first original) and toner image (M) (obtained from the first original) are transferred onto the intermediate transfer belt 21.

Then, using the image data (Y) (obtained from the second original) stored in and read out from the image memory 10, an electrostatic latent image (Y) is formed on the photosensitive drum 11, a toner image (Y) is formed therefrom and is transferred onto the intermediate transfer belt 21 at the same position as that at which the toner image (K) (obtained from the second original), toner image (C) (obtained from the second original) and toner image (M) (obtained from the second original) are previously transferred onto the intermediate transfer belt 21.

Thus, the two full-color toner images (obtained from the first and second originals) are obtained on the intermediate transfer belt 21 at the same time as a result of the toner image (K) (obtained from the first original), toner image (C) (obtained from the first original), toner image (M) (obtained from the first original) and toner image (Y) (obtained from the second original) being laid one on top of another at the same position, and the toner image (K) (obtained from the second original), toner image (C) (obtained from the second original), toner image (M) (obtained from the second original) and toner image (Y) (obtained from the second original) being laid one on top of another at the same position. The thus-obtained two full-color toner images are transferred onto transfer paper sheets and fixed thereon, one by one.

In the second embodiment of the present invention, operations the same as those described above are performed, in the above-mentioned case where two color originals are read and the corresponding color toner images are formed on the intermediate transfer belt 21 at the same time as shown in FIG. 13, except that the selector 71-B shown in FIG. 9 selects one of the Lsync and the motor driving signal in accordance with the selection signal. When the motor driving signal is selected, the counter 71-A counts pulses of the motor driving signal as described above for measuring the times t1, t2, t3 and t4 shown in FIG. 14. However, when the Lsync is selected, the counter 71-A counts pulses of the Lsync instead of pulses of the motor driving signal for the same purpose. A method for selecting an appropriate one of the Lsync and the motor driving signal in accordance with the selection signal is the same as the method described above using FIGS. 11 and 12.

Further, the present invention is not limited to the above-described embodiments and variations and modifications may be made without departing from the scope of the present invention.

The present application is based on Japanese priority application No. 11-077193, filed on Mar. 23, 1999, the entire contents of which are hereby incorporated by reference.

What is claimed is:

1. An image forming apparatus comprising:

a photosensitive drum turning at a constant angular velocity;

means for writing an electrostatic latent image on said photosensitive drum using a laser beam having an intensity in accordance with image data output by an original reading unit which reads an original and outputs the image data thus obtained from said original or image data stored and read out from a memory;

means for developing the electrostatic latent image formed on said photosensitive drum into a toner image; and an intermediate transfer belt running at a constant speed, onto which the toner image is transferred from said photosensitive drum, a reference mark being provided on said intermediate transfer belt;

said memory for storing the image data output by said original reading unit;

means for detecting said reference mark;

means for counting pulses of a motor driving signal and outputting a count value, the pulses being used for driving a scanner motor provided in said original reading unit at different speeds so as to enable the original to be read at different speeds; and means for determining, based on the count value, a time period between a time said detecting means detects said reference mark and a time said writing means starts writing the electrostatic latent image on said photosensitive drum, when the electrostatic latent image is formed using the image data output by said original reading unit directly and the electrostatic latent image is formed using the image data stored and read out from said memory.

2. The image forming apparatus as claimed in claim 1, wherein, when a color image is formed, the electrostatic latent image is formed using the image data output by said original reading unit directly for a first color, and the electrostatic latent image is formed using the image data stored and read out from said memory for each of second and following colors.

3. The image forming apparatus as claimed in claim 1, wherein the pulses of the motor driving signal are not provided to said scanner motor when the electrostatic latent image is formed using the image data stored and read out from said memory.

4. An image forming apparatus comprising:

a photosensitive drum turning at a constant angular velocity;

means for writing an electrostatic latent image on said photosensitive drum using a laser beam having an intensity in accordance with image data output by an original reading unit which reads an original and outputs the image data thus obtained from said original or image data stored and read out from a memory;

means for developing the electrostatic latent image formed on said photosensitive drum into a toner image; and an intermediate transfer belt running at a constant speed, onto which the toner image is transferred from said photosensitive drum, a reference mark being provided on said intermediate transfer belt;

said memory for storing the image data output by said original reading unit;

means for detecting said reference mark;

means for selecting, depending on an arbitrarily set magnification, either pulses of a line synchronization signal or pulses of a motor driving signal, each of the pulses of the line synchronization signal being generated when the laser beam scans said photosensitive drum in a main scan direction and the pulses of the motor driving signal being used for driving a scanner motor provided in said original reading unit at different speeds so as to enable the original to be read at different speeds so as to enable the magnification to be set to different values;

means for counting the pulses of the signal selected by the selecting means and outputting a count value; and means for determining, based on the count value, a time period between a time said detecting means detects said reference mark and a time said writing means starts writing the electrostatic latent image on said photosensitive drum, when the electrostatic latent image is formed using the image data output by said original reading unit directly and the electrostatic latent image is formed using the image data stored and read out from said memory.

5. The image forming apparatus as claimed in claim 4, wherein, when a color image is formed, the electrostatic latent image is formed using the image data output by said original reading unit directly for a first color, and the electrostatic latent image is formed using the image data stored and read out from said image memory for each of second and following colors.

6. The image forming apparatus as claimed in claim 4, wherein the pulses of the motor driving signal are not provided to said scanner motor when the electrostatic latent image is formed using the image data stored and read out from said memory.

7. The image forming apparatus as claimed in claim 4, wherein the selecting means selects pulses of one of the line synchronization signal and the motor driving signal, which one is a signal, the distance moved by a carriage of said original reading unit per pulse of said signal being shorter than the distance moved by said carriage of said original reading unit per pulse of the other signal, said carriage being driven by said scanner motor and used for reading the original by moving in a sub-scan direction.

8. An image forming apparatus comprising:

a photosensitive drum turning at a constant angular velocity;

a writing unit which writes an electrostatic latent image on said photosensitive drum using a laser beam having an intensity in accordance with image data output by an original reading unit which reads an original and outputs the image data thus obtained from said original or image data stored and read out from a memory;

a developing unit which develops the electrostatic latent image formed on said photosensitive drum into a toner image; and an intermediate transfer belt running at a constant speed, onto which the toner image is transferred from said photosensitive drum, a reference mark being provided on said intermediate transfer belt;

said memory for storing the image data output by said original reading unit;

a detecting unit which detects said reference mark;

a counting unit which counts pulses of a motor driving signal and outputting a count value, the pulses being used for driving a scanner motor provided in said original reading unit at different speeds so as to enable the original to be read at different speeds; and a determining portion which determines, based on the count value, a time period between a time said detecting unit detects said reference mark and a time said writing unit starts writing the electrostatic latent image on said photosensitive drum, when the electrostatic latent image is formed using the image data output by said original reading unit directly and the electrostatic latent image is formed using the image data stored and read out from said memory.

9. An image forming apparatus comprising:

a photosensitive drum turning at a constant angular velocity;

a writing unit which writes an electrostatic latent image on said photosensitive drum using a laser beam having an intensity in accordance with image data output by an original reading unit which reads an original and outputs the image data thus obtained from said original or image data stored and read out from a memory;

a developing unit which develops the electrostatic latent image formed on said photosensitive drum into a toner image; and an intermediate transfer belt running at a constant speed, onto which the toner image is transferred from said photosensitive drum, a reference mark being provided on said intermediate transfer belt;

said memory for storing the image data output by said original reading unit;

a detecting unit which detects said reference mark;

a selecting unit which selects, depending on an arbitrarily set magnification, either pulses of a line synchronization signal or pulses of a motor driving signal, each of the pulses of the line synchronization signal being generated when the laser beam scans said photosensitive drum in a main scan direction and the pulses of the motor driving signal being used for driving a scanner motor provided in said original reading unit at different speeds so as to enable the original to be read at different speeds so as to enable the magnification of said apparatus to be set to different values;

a counting unit which counts the pulses of the signal selected by the selecting unit and outputs a thus-obtained count value; and a determining unit which determines, based on the count value, a time period between a time said detecting unit detects said reference mark and a time said writing unit starts writing the electrostatic latent image on said photosensitive drum, when the electrostatic latent image is formed using the image data output by said original reading unit directly and the electrostatic latent image is formed using the image data stored and read out from said memory.

10. An image forming method comprising the steps of:

writing an electrostatic latent image on a photosensitive drum, which turns at a constant angular velocity, using a laser beam having an intensity in accordance with image data output by an original reading unit which reads an original and outputs the image data thus obtained from said original or image data stored and read out from a memory;

developing the electrostatic latent image formed on said photosensitive drum into a toner image; and transferring the toner image onto an intermediate transfer belt, which runs at a constant speed, from said photosensitive drum, a reference mark being provided on said intermediate transfer belt;

storing, in said memory, the image data output by said original reading unit;

detecting said reference mark;

counting pulses of a motor driving signal and outputting a thus-obtained count value, the pulses being used for driving a scanner motor provided in said original reading unit at different speeds so as to enable the original to be read at different speeds; and determining, based on the count value, a time period between a time said detecting step detects said reference mark and a time said writing step starts writing the electrostatic latent image on said photosensitive drum, when the electrostatic latent image is formed using the image data output by said original reading unit directly and the electrostatic latent image is formed using the image data stored and read out from said memory.

11. An image forming method comprising the steps of:

writing an electrostatic latent image on a photosensitive drum, which turns at a constant angular velocity, using a laser beam having an intensity in accordance with image data output by an original reading unit which reads an original and outputs the image data thus obtained from said original or image data stored and read out from a memory;

developing the electrostatic latent image formed on said photosensitive drum into a toner image; and transferring the toner image onto an intermediate transfer belt, which runs at a constant speed, from said photosensitive drum, a reference mark being provided on said intermediate transfer belt;

storing, in said memory, the image data output by said original reading unit;

detecting said reference mark;

selecting, depending on an arbitrarily set magnification, either pulses of a line synchronization signal or pulses of a motor driving signal, each of the pulses of the line synchronization signal being generated when the laser beam scans said photosensitive drum in a main scan direction and the pulses of the motor driving signal being used for driving a scanner motor provided in said original reading unit at different speeds so as to enable the original to be read at different speeds so as to enable the magnification to be set to different values;

counting the pulses of the signal selected by the selecting step and outputting a thus-obtained count value; and determining, based on the count value, a time period between a time said detecting step detects said reference mark and a time said writing step starts writing the electrostatic latent image on said photosensitive drum, when the electrostatic latent image is formed using the image data output by said original reading unit directly and the electrostatic latent image is formed using the image data stored and read out from said memory.

* * * * *